C. E. SKELTON.
REAMER.
APPLICATION FILED MAR. 28, 1919.

1,405,020.

Patented Jan. 31, 1922.

CHARLES E. SKELTON, INVENTOR.

BY *Parsons & Bodell*
ATTORNEYS.

UNITED STATES PATENT OFFICE.

CHARLES E. SKELTON, OF EAST ONONDAGA, NEW YORK.

REAMER.

1,405,020.   Specification of Letters Patent.   Patented Jan. 31, 1922.

Application filed March 28, 1919. Serial No. 285,734.

*To all whom it may concern:*

Be it known that I, CHARLES E. SKELTON, a citizen of the United States, and a resident of East Onondaga, in the county of Onondaga and State of New York, have invented a certain new and useful Reamer, of which the following is a specification.

This invention relates to reamers and has for its object a reamer so constructed that the wall of the groove, formed in a face of the reamer to form the cutting edge, intersects said face at the same angle throughout the length of the cutting edge, and the invention consists in the novel features hereinafter set forth and claimed.

In describing this invention, reference is had to the accompanying drawings in which like characters designate corresponding parts in all the views.

Figure 1:
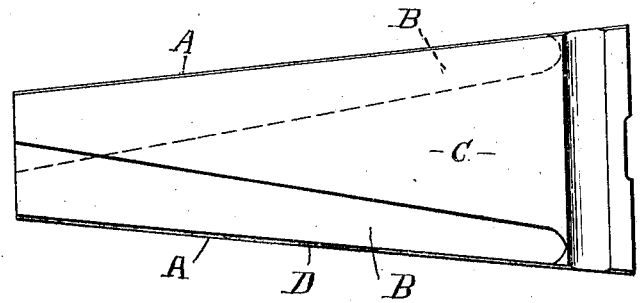
Figures 1 and 2 are, respectively, a plan view, and a side elevation of a reamer, embodying my invention.
Figure 2:
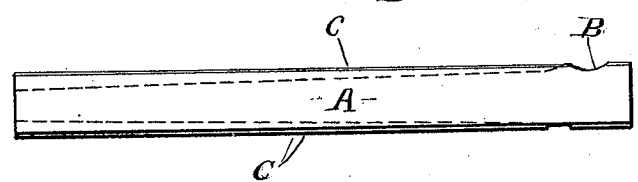
Figure 3:
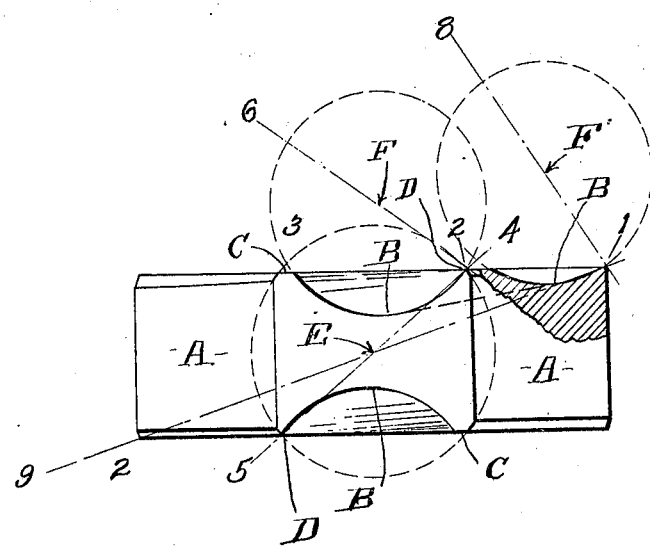
Figure 3 is an end elevation, partly in section of my reamer.

In reamers having a cutting edge formed by the intersection of a conical, flat or cylindrical face and the bottom of a cylindrical groove formed in said face, if the diameter of the reamer varies or the reamer tapers, the cutting edge so changes in shape that the cutting qualities of said edge are impaired. Hence, especially a reamer having a very steep taper, would, if the groove were the same depth at all points, present a cross section at its large diameter showing a much different angle for the cutting edge with respect to a plane radial with the center line of the reamer from the angle at the small end. This causes different qualities in the blade from point to heel. A reamer so formed with the correct angle at the cutting edge at the point will have a cutting edge at the large end of the reamer that will be undercut to such an extent that sufficient material to carry off the frictional heat is not available, and hence the chips weld to the blade.

In my reamer the angle of the groove forming the cutting edge, with respect to the center or axis of rotation of the reamer is the same throughout the cutting edge.

My reamer is provided with a tapering side A and with a groove B in a flat side C thereof which meets or intersects the side A. The bottom of the groove B intersects the face C near the tapering side A to form the cutting edge D and the bottom of the groove where it intersects the face C to form the cutting edge D, is at the same angle throughout the cutting edge with respect to the plane radial with the axis or center of rotation E of the reamer and tangent to the cutting edge.

As here shown, the reamer is formed double, that is, it has cutting edges D on opposite faces C thereof, and is rectangular at its opposite ends, the reamer being of greater width at one end than at the other owing to the taper of the faces A but being of the same depth or thickness throughout its length between the faces C which are parallel to the axis of the reamer. Thus, the opposite ends of the reamer are in the form of rectangles of equal dimension in one direction but the rectangle at the rear end of the reamer is oblong while that of the smaller end approaches a square.

The groove B is preferably substantially cylindrically curved, and lines or planes as 4—5 radial with or passing through the axis E of the reamer tangent to the cutting edge D have the same angle to a line as 6—2 passing through the center F of the arc of the bottom of the groove B and through said point of tangency at 2 as other lines similarly drawn at any other point along the cutting edge as for instance the lines 9—1—8.

In other words, the cutting edge is located throughout its length at the intersection of planes radial with the axis of the reamer and with the axis or center line of the arc of the bottom of the grooves.

In the present embodiment of my invention, the groove is so placed that the center line of the arc of the groove is about 15° less than a line drawn perpendicular to a line as 5—4 or 9—1 passing through the center E of the reamer tangent to the cutting edge of the reamer, or the angle formed by planes radial with the axis of the reamer and the axis or center line of the arc of the bottom of the groove is 15° less than a right angle.

The groove B in this form of reamer decreases in depth from the small end of the reamer toward the large end.

What I claim is:

1. A reamer having a tapering side and a straight cylindrical groove formed in a face which meets said tapering side, the groove extending in a general direction lengthwise of the axis of the reamer and located parallel to and adjacent the corner formed by the tapering side and the grooved face of the reamer, one side of the groove intersecting the face of the reamer in which the groove is formed at the same angle at both ends of the reamer and at all points between said ends and forming the cutting edge, substantially as and for the purpose described.

2. A reamer having a tapering side, a substantially flat face meeting the tapering side and a substantially cylindrical groove in such substantially flat face, the groove extending along the corner formed by the tapering side and the face in which the groove is formed and one side of the groove intersecting said face of the reamer to form the cutting edge at the same angle at both ends of the reamer and at all points between said ends, substantially as and for the purpose specified.

3. A reamer having a tapering side and a substantially cylindrical groove in a face thereof which meets the tapering side, the bottom of the groove intersecting said face to form the cutting edge, the center of the arc of the groove being so arranged relatively to the axis of rotation of the reamer that planes radial with the axis of the reamer and the center of the arc of the groove and intersecting at the cutting edge form the same angle at all points between the ends of the reamer, substantially as and for the purpose set forth.

4. A reamer having a tapering side, a substantially flat face meeting the tapering side, and a groove in the face thereof which meets a tapering side, the groove extending along the edge formed by said tapering side and the grooved face and intersecting said face to form the cutting edge, the center line of the arc of the groove being out of parallelism with the cutting edge and said groove decreasing in depth from one end of the reamer toward the other, substantially as and for the purpose described.

5. A reamer having a tapering side, and a face extending parallel to the axis of the reamer, said face being formed with a cylindrical groove extending along the corner formed by the tapering side and said face and forming the cutting edge, the center line of the arc of the groove being so arranged relatively to the axis of rotation of the reamer and that planes radial with the axis of the reamer and the center line of the arc of the groove intersect in the cutting edge at all points lengthwise of the cutting edge, substantially as and for the purpose described.

In testimony whereof, I have hereunto signed my name at Syracuse, in the county of Onondaga, and State of New York.

CHARLES E. SKELTON.